United States Patent [19]

Jones

[11] 4,178,878
[45] Dec. 18, 1979

[54] FISH EGG PLANTING METHOD

[76] Inventor: Tod A. Jones, Box 1288, Wrangell, Ak. 99929

[21] Appl. No.: 927,357

[22] Filed: Jul. 24, 1978

Related U.S. Application Data

[62] Division of Ser. No. 806,445, Jun. 14, 1977, Pat. No. 4,130,086.

[51] Int. Cl.² ............................................. A01K 61/00
[52] U.S. Cl. .......................................................... 119/3
[58] Field of Search ................................. 119/3; 111/6

[56] References Cited

U.S. PATENT DOCUMENTS

| | | | |
|---|---|---|---|
| 160,002 | 2/1875 | Bond | 119/3 |
| 180,085 | 7/1876 | Wilmot | 119/3 |
| 405,713 | 6/1889 | Lugrin et al. | 119/3 |
| 2,955,569 | 10/1960 | Dahlin | 119/3 |
| 3,394,667 | 7/1968 | White | 111/6 |
| 3,464,385 | 9/1969 | Pellett, Sr. | 119/3 |

Primary Examiner—Hugh R. Chamblee
Attorney, Agent, or Firm—Lyon & Lyon

[57] ABSTRACT

Described herein is a novel method for the implantation of fish eggs usually salmonidae eggs in a stream or lake bed and the accompanying apparatus. In practicing this invention the stream or lake bed substrate is subjected to high pressure hydraulic flushing to loosen the gravel and remove undesirable sediment. Once the substrate has been properly prepared fertilized eggs are injected by means of hydraulic pressure into the substrate. The egg planting device of this invention comprises a receptacle for the fertilized eggs which has a valved orifice at its base through which the eggs pass into a central chamber and which central chamber has a lateral orifice to permit the entry of water; the flow of the water being governed by a control valve and the base of the central chamber being provided with a rigid hollow tubing adapted for insertion into the substrate.

14 Claims, 3 Drawing Figures

FISH EGG PLANTING METHOD

CROSS-REFERENCE TO RELATED APPLICATION

This application is a divisional of application Ser. No. 806,445, filed June 14, 1977, now issued as U.S. Pat. No. 4,130,086.

BACKGROUND OF THE INVENTION

For countless generations, man in his perpetual quest to subdue the forces of nature has been little concerned with ecological consequences. Increasing population with the concomitant urban sprawl has resulted in the denuding of forests, damming of rivers and streams and the filling of marshlands. This conduct has greatly affected the delicate balance of the earth's ecosystem. Consequently, many biological and zoological forms of life are faced with inevitable extinction because of dwindling natural habitats.

Threatened flora and fauna have few avenues available to avert the tide of "progress" and many of these approaches are not feasible because of the amount of time involved. For example, natural selection, which would develop species immune to man's alteration of the environment, is a slow gradual process. Because of rapid deterioration of the environment, many species will be extinct long before this biological phenomenon will have any consequences. A drastic alternative, which is not feasible, would entail a moratorium on further development coupled with attempts to reduce much of man's present unfavorable impact on the environment.

The only viable alternative presently available to these approaches is to formulate a means whereby the plants and animals may live in a protected, though unfortunately considerably limited environment. Thus, we find many zoological gardens attempting to provide threatened species with a simulated habitat. By faithfully copying the creatures natural home, the stresses caused by man's encroachment are lessened and the animal is more apt to procreate and continue the species. However, this has limitations, the most notable being financial. The public is not quite ready for the protection of the earth's non-human inhabitants on a large scale. A further limitation on this system of surrogate homes is that many animals do not spend their whole life in one habitat. Among these are salmon who spawn their eggs near the head waters of fresh water streams and rivers but spend the bulk of their adult lives in the ocean. As a result, the costs of duplicating these multiple native environments is prohibitive.

The influx of people to the Pacific Northwest and Alaska has brought about numerous problems for salmon. Many of the streams traveled to spawn their eggs have been dammed. Others have become so polluted that no living creature can survive. Still others have become too shallow or diverted from their natural course because of the ever increasing needs for water in domestic and industrial use. Consequently, the available streams for spawning of salmon eggs has dwindled. The salmon population is also beset with additional deletorious factors such as predator pressures. Predator difficulties seem to be magnified when the salmon population undergoes the stress of extraordinary natural and man-made environmental influences.

In order to rejuvenate the salmon population several attempts have been made to overcome the problem of loss of natural spawning grounds. Unfortunately, however, numerous unsolved problems remained. For instance, in U.S. Pat. No. 3,464,385 to Pellett, the patentee teaches a method of rehabilitating salmon spawning streams by bubbling air through the stream bed gravel from a number of points periodically spaced throughout the spawning area. The added oxygen was primarily used to offset silt suffocation. While this approach may have some beneficial aspects, it does not, however, radically increase the production of salmon. Furthermore, it requires placing the aerator under the bed of the stream. This may entail temporarily damming the stream or diverting it from its bed. Even if the device were set up without disturbing the stream's course, its installation is still cumbersome.

Other attempts have been made to increase the salmon population. Most significant of these are the experiments undertaken at Abernathy Creek near Longview, Wash. The results of these experiments are described in an article by Allen E. Thomas entitled Effect of *Egg Development at Planting on Chinook Salmon Survival*, 37 Progressive Fish-Culturist 231 (October 1975) and in a joint article by Allen E. Thomas and J. M. Shelton entitled *Operation of Abernathy Channel for Incubation of Salmon Eggs*, Technical Papers of the Bureau of Sport Fisheries and Wildlife published by the U.S. Department of the Interior, the disclosures of which are incorporated by reference.

At Abernathy Channel, an artificial spawning and incubation channel, salmon and trout eggs were deposited in trenches in natural spawning gravel or artifical incubation channels. Three types of salmon eggs were planted. Unwater-hardened eggs were planted immediately after fertilization. Water hardened eggs had been fertilized, washed free of silt and water hardened for one hour before planting. After the eggs in the third group were washed and water hardened in hatchery troughs, they were incubated until the eyed stage was reached and then planted. The survival percentages of the salmon to the migrant fry stage was 50.1 percent from water unhardened eggs, 37.6 percent from water hardened, and 73.4 percent from eyed.

The difficulty with the Abernathy Creek experiment was that it required construction of a special incubation channel and a settling pond for siltation. The channel had to be designed so that the build up of silt was prevented because of silt's deleterious effect on the incubation and hatching of salmon eggs. Also, care had to be taken to prevent adult salmon from entering the channel. The major difficulty was the time consuming trench digging in the channel for the planting of the salmonid eggs and the construction of the settling pond. It is evident from the results of the Abernathy Creek experiment that there was a critical need for a means of planting salmon eggs that did not require the expense and labor of a specially built and designed channel.

It is an object of this invention to provide a method and apparatus for the planting of salmon eggs which combines ease of operation, portability and high yields of fry.

BRIEF SUMMARY OF THE INVENTION

According to this invention, there is described a novel apparatus useful in planting salmonid and other fish eggs in stream and lake beds. Also included is a method of planting such eggs.

DETAILED DESCRIPTION OF THE INVENTION

The present invention describes an apparatus that permits the planting of salmonid and other fish eggs in stream and lake beds without the necessity of complex channels and permanent facilities such as hatchery buildings. Also included is a method of planting fish eggs including salmon eggs without the use of difficult to prepare trenches and settling ponds.

Figure 1:
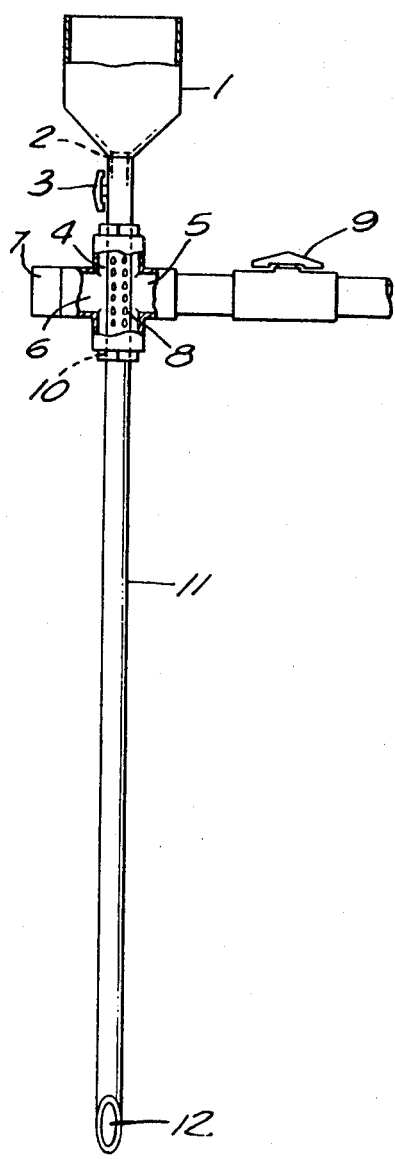
FIG. 1 is a detailed view of the article of this invention.

Referring to FIG. 1, the article of this invention is comprised of a hopper or bin 1 used as a receptacle for fertilized fish eggs. This hopper has an opening at its base 2 which permits the fertilized eggs to flow from the hopper. To regulate the flow of fertilized salmon eggs from the hopper and to prevent upflowing of water during flushing control valve 3 is utilized. The hopper 1 is connected with central chamber 4. This chamber 4 has a pair of lateral openings 5 and 6. Lateral opening 6 is capped by cap 7 to prevent leakage of water. Water is pumped from a water source, usually from upstream by means of a pump (not shown), into lateral opening 5 of central chamber 4 though perforations 8. In order to regulate the flow of water, control valve 9 is employed. From the central chamber 4 the water, followed by the fertilized eggs, exits through opening 10 into a length of rigid hollow tubing 11 having a pointed base 12 for easy insertion into the stream bed substrates.

During operation, valve 3 is in a closed position, while water is pumped into the hollow chamber 4 and is diverted down through the length of rigid hollow tubing 10. The pressure of the water flushes the stream bed intragravel fines to loosen the gravel and remove life-smothering sediments. Through the hydraulic pumping action, the device easily works its way into the gravel.

When the apparatus is being used for desiltation and flushing alone, higher water flows are often desirable. In that case, the main valve is opened wide and the pump achieves maximum rpm. During egg deposition, however, water flows are restricted and probing is executed so as to prevent flushing out of previously deposited eggs in gravels adjacent to the planting plot. Thus, once an appropriate depth is reached and proper flushing of the silt and fines from the substrate has been achieved, the control valve 9 is placed in a reduced flow or closed position. Fertilized salmon eggs are introduced into the hopper 1 and permitted to flow down rigid hollow tube 11 by opening control valve 3. Once the eggs have settled to the base of tube 11, the apparatus is gently withdrawn from the substrate permitting the eggs to mix with the gravel.

Figure 2:
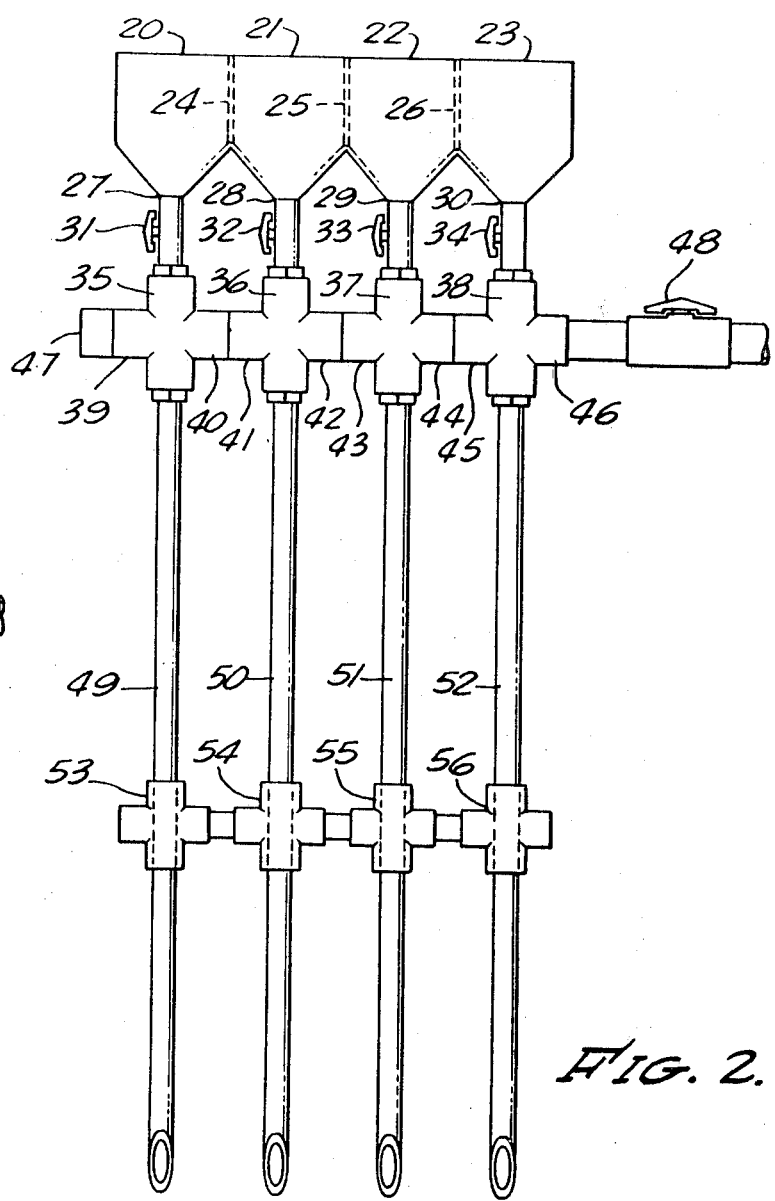
FIG. 2 is a plurality of salmon egg planters joined for a multiplicity of simultaneous plantings.

A detailed view of the preferred embodiment of the present invention wherein a plurality of planters are joined to permit a multiplicity of simultaneous plantings is shown in FIG. 2. In this embodiment there is exhibited a plurality of interconnected hoppers 20-23 preferably 2 to 6 with splash baffles 24-26 containing, preferably, periodically placed, 3/16" perforations at the point of connection. These hoppers have an opening at their respective bases 27-30. Attached to each hopper opening between the hopper and the hollow chamber 35-38 are control valves 31-34. Each chamber has a pair of lateral openings 39-40, 41-42, 43-44, 45-46. Lateral opening 39 is capped by cap 47. Opening 40 of chamber 35 is connected to opening 41 of chamber 36. Opening 42 of chamber 36 is connected to opening 43 of chamber 37 and opening 44 of chamber 37 is attached to opening 45. Joinder may be accomplished by any appropriate means provided it is sufficiently strong to withstand the pressure exerted by the water without leaking. Water is pumped into lateral opening 46 from the water source. Flow of the water is regulated by control valve 48. These valves can be, for example, either a ball or gate valve. Connected to the base of each central chamber 35-38 is a length of rigid hollow tubing 49-52. This tubing is preferably 1" diameter polyvinyl chloride (PVC) pipe, however, other suitable materials may be employed. In order to prevent distortion of the rigid tubing during insertion, 4-way "T" stiffness 53-56 may be employed. However, suitable reinforcement may be obtained from numerous other materials.

During operation, after the water has been pumped through the device and has sufficiently loosened the gravel and removed sediment, the eggs in each hopper may be planted in unison or each bin may be planted in succession depending upon the operator's preference. The operation of the multiple planting device is the same as the single device.

Figure 3:
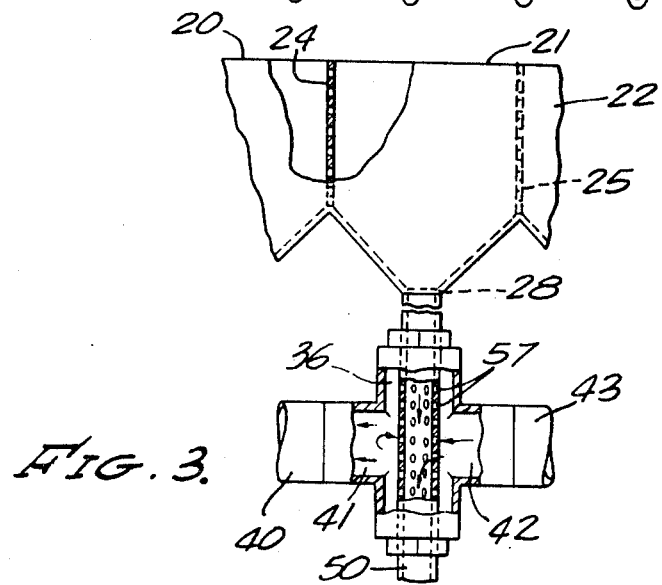
FIG. 3 is a cutaway view of the central chamber of the present invention.

FIG. 3 is a cutaway view of a hollow chamber 36 shown in FIG. 2 giving a detailed view of the interior with the perforations 57. These perforations permit water to flow through the hollow tubing but prevent the fertilized eggs from becoming entrapped in the central chamber. The splash baffles 24 between hoppers 20 and 21 are also shown.

The article of the present invention and the accompanying method may be used to plant in either stream beds or lake beds. In addition to salmon, this invention is useful in the planting of eggs of other salmonid species such as trout and steelhead.

Besides the two primary functions of the salmonid egg planting device, hydraulic flushing of sediments and deposition of fertilized salmonid eggs, this invention is instrumental in the removal of redeposited siltation on the surface of the stream bed after egg deposition and the injection of nutrients into the water and/or incubation gravel. Also the invention may be used in the removal of adult predators and larvae predators either prior to deposition or during incubation.

By repeating this sequence of flushing and deposition, the stream or lake bed can be seeded to any desired egg density. The density, however, is dependent upon substrate geomorphology which includes, for example, the following variables, rubble size, size/abundance ratios and the composition of the rubble, depth and degree of aqueous irrigation in the substrate, dissolved oxygen content of the irrigating waters, the species of fish involved, biological oxygen demand of the substrate, amount and form of water flow on the stream bed surface and the dynamics of upwelling intragravel water.

At the present time established known figures for egg densities which result in successful fry survival exceed 7,000 eggs per square meter. The use of this apparatus allows for adding an additional dimensions to salmonid egg planting: multiple depth planting. Estimates of potential densities in excess of 25,000 eggs per cubic meter for ideal gravels have been suggested. Thus, greater production of salmon may be obtained from physically limited spawning areas.

As water intake is generally from an upstream source the flushing and planting proceeds in a downstream progression. The insertion of a venturi valve at any point in the pump's exhaust stem to the main water control valve air may be introduced into the system. The resulting venturi effect gives additional lifting quality to the flushing process.

In order to test for favorable water flow during sequential egg deposition, a 2" diameter PVC pipe is inserted into the substrate at the desired planting depth. When the probing activities are too close together, water is forced through the gravel raising the water level in the 2" tube. When no detectable change in the water level occurs, appropriate waterflow and separation of the egg deposition sites will have been achieved for the specific gravel composition and conditions of that portion of the stream bed. Once a satisfactory determination has been achieved, egg deposition may proceed. However, it is advantageous to repeat the test should changes in resistance to probe insertion or change in gravel size be noticed.

Choice of the appropriate stream bed spawning environment is primarily dependent upon the natural history and physiological requirements of each species. Pink Salmon (*Onchorynchus gorbuscha*) are capable of spawning on tidal flats where the water's salinity varies with every tide. Pink Salmon are more resistant to the repeated salt water flushes that are associated with high tidal action wherein King Salmon (*Onchorynchus tshawytscha*) eggs are intolerant to salt water.

The benefits attendant to the use of this invention are numerous. An important factor is that artificial fertilization avoids gamete retention, other social responses that inhibit spawning and wasting viable gametes, etc. Also, a favorable planting depth may be easily achieved so that problems caused by scouring, frost, and predators may be avoided. Furthermore, the invention allows for multi-level egg deposition while still permitting the upper gradient of the substrate to be utilized for natural spawning.

While other methods of mechanical egg planting show successful egg to fry survival ratios none have the benefit of a highly effective flushing action to remove sediment, exactness of deposition, and the patterned deposition permitted by this invention. This invention, by permitting in-stream planting avoids the ecological and other problems incumbent in diverting stream flow, slowing or controlling water volume or the construction of expensive incubation channels. However, where an incubation channel has been constructed this invention may be used to increase yield of salmon fry.

While this invention has been described by reference to the preferred embodiments thereof, it will be understood that the invention is not limited thereto, but only to the lawful scope of the appended claims.

What is claimed is:

1. Method of planting fertilized fish eggs in a stream or lake bed substrate which comprises the steps of:
    subjecting the substrate to high pressure hydraulic flushing with a flushing device to loosen gravel and remove sediment prior to deposition of the fertilized fish eggs;
    selecting the depth at which to deposit fertilized fish eggs in the flushed substrate; and
    depositing said fertilized fish eggs into the flushed substrate at the depth previously selected, said depositing being accomplished with a flushing device.

2. The method according to claim 1 wherein said stream or lake bed is a natural stream or lake.

3. The method according to claim 1 or 2 wherein said flushing and depositing are accomplished with the same device.

4. The method according to claim 1 or claim 2 wherein nutrients are injected into the incubation gravel by means of hydraulic pressure.

5. The method according to claim 1 or claim 2 wherein nutrients are injected into the water.

6. The method according to claim 1 or 2 wherein redeposited siltation on the surface of the stream bed is removed after egg injection by hydraulic flushing.

7. The method according to claim 1 or 2 wherein predators are removed prior to egg injection and during incubation of the eggs by means of hydraulic flushing.

8. The method according to claim 1 or 2 wherein the deposited fish eggs are mixed with the gravel and sand in the substrate.

9. The method according to claim 1 or 2 wherein multiple depths are selected for depositing said fertilized fish eggs.

10. The method according to claim 1 or 2 wherein depositing of said fertilized fish eggs is selectively controlled by controlling the flushing pressure.

11. A method for planting fertilized fish eggs in a stream or lake bed substrate according to claim 1 or claim 2 wherein a plurality of flushing devices and depositing devices are cooperatively employed to accomplish said deposition of fertilized fish eggs.

12. A method for planting fertilized fish eggs in a stream or lake bed substrate which comprises the steps of:
    lowering a hydraulic flushing device to the uppermost portion to the substrate;
    passing water under pressure through said flushing device to loosen gravel and remove sediment in said bed;
    determining the level at which the deposit of fertilized fish eggs shall be accomplished;
    depositing said fertilized fish eggs at said determined level by passing, in a controlled manner, said eggs through said device;
    utilizing said flushing device to remove redeposited slit and other undesirable material; and
    passing nutrients through said flushing device to the substrate.

13. The method of claim 12 wherein said stream or lake bed is a natural stream or lake bed.

14. A method for planting fertilized fish eggs in a stream or lake bed substrate according to claim 12 or claim 13 wherein a plurality of flushing devices and depositing devices are cooperatively employed to accomplish said deposition of fertilized eggs.

* * * * *